United States Patent
Zeng

(10) Patent No.: US 6,668,917 B1
(45) Date of Patent: Dec. 30, 2003

(54) ENERGY SAVING DEFOG/DEVICE OPERATION STRATEGY AND CONTROL SCHEME FOR VEHICLES

(75) Inventor: Xin Zeng, Auburn Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/480,603

(22) Filed: Jan. 10, 2000

(51) Int. Cl.[7] .................................................. B60H 1/00
(52) U.S. Cl. ...................... 165/202; 165/240; 165/222; 165/288; 62/156; 236/91 C; 236/91 D
(58) Field of Search ............................ 165/42, 43, 201, 165/202, 203, 204, 240, 222, 288; 454/93, 121; 62/156; 237/2 A, 2 R; 236/91 C, 91 D

(56) References Cited

U.S. PATENT DOCUMENTS

| | | | |
|---|---|---|---|
| 3,936,793 A | | 2/1976 | Armstrong ................... 337/300 |
| 4,205,381 A | | 5/1980 | Games et al. ................. 364/505 |
| 4,967,567 A | | 11/1990 | Proctor et al. ................. 62/127 |
| 4,974,665 A | | 12/1990 | Zillner ......................... 165/21 |
| 5,033,672 A | | 7/1991 | Sakamoto et al. ............. 236/44 |
| 5,275,012 A | * | 1/1994 | Dage et al. .............. 237/2 A X |
| 5,294,050 A | * | 3/1994 | Hoffman et al. ............. 237/2 A |
| 5,305,613 A | * | 4/1994 | Hotta et al. ................ 454/93 X |
| 5,331,823 A | * | 7/1994 | Matsuoka .................. 454/93 X |
| 5,514,035 A | | 5/1996 | Denniston ................... 454/121 |
| 5,516,041 A | | 5/1996 | Davis et al. ................ 236/49.3 |
| 5,518,176 A | * | 5/1996 | Turner et al. ......... 236/91 C X |
| 5,531,377 A | * | 7/1996 | Thayer et al. ........ 236/91 C X |
| 5,544,809 A | | 8/1996 | Keating et al. ................ 236/44 |
| 5,651,498 A | | 7/1997 | Meyer et al. .................. 236/44 |
| 5,685,162 A | * | 11/1997 | Iritani et al. .................. 62/156 |
| 5,706,664 A | * | 1/1998 | Hara ....................... 165/240 X |
| 5,791,407 A | * | 8/1998 | Hammons .................... 165/202 |
| 5,971,066 A | * | 10/1999 | Oehring et al. ........... 165/42 X |
| 5,971,287 A | * | 10/1999 | Kettner et al. .......... 454/121 X |
| 5,983,649 A | * | 11/1999 | Aislabie et al. ......... 454/121 X |
| 6,029,466 A | * | 2/2000 | Wieszt |
| 6,094,930 A | * | 8/2000 | Zeng et al. |
| 6,112,807 A | * | 9/2000 | Dage .......................... 165/202 |
| 6,155,061 A | * | 12/2000 | Davis, Jr. et al. ....... 165/204 X |

\* cited by examiner

Primary Examiner—Ljiljana Ciric
(74) Attorney, Agent, or Firm—Christopher DeVries

(57) ABSTRACT

An energy-saving method for operating a climate control system includes reporting an ambient outside temperature from a first temperature sensor to a controller unit and reporting a climate control air temperature from a second temperature sensor to the controller unit. The control unit performs an algorithm to define a control criterion value in response to the ambient outside temperature. A non-refrigeration cycle based heating element is activated to provide heated air to an interior surface of a windshield if the climate control air temperature is above the control criterion value. Moreover, a refrigeration cycle based cooling element and the non-refrigeration cycle based heating element are activated to provide the heated air to the interior surface of the windshield if the climate control air temperature is at or below the control criterion.

15 Claims, 5 Drawing Sheets

Illustration of Applying Fogging Criterion

ENERGY SAVING DEFOG/DEVICE OPERATION STRATEGY AND CONTROL SCHEME FOR VEHICLES

The present invention is related to an automobile defrost/deice operation.

BACKGROUND

Passenger comfort and fuel efficiency have set forth increasing demands on automotive heating, ventilating and air-conditioning (HVAC) systems. It is a primary goal of most HVAC systems to detect and avoid internal climate conditions that will result in windshield/window fogging.

As a result, newer and improved automotive HVAC systems are configured to communicate with a plurality of sensors and control actuators. For example, an automotive HVAC system may have a plurality of temperature sensors for measuring the internal temperature of the automobile, the outside temperature and the temperature at various locations within the ductwork of the HVAC system.

In addition, the system will also have user manipulated control settings for varying air temperature, fan speed, direct airflow, vary air recirculation ratio and other relevant settings.

Accordingly, and in order to prevent undesired fogging conditions, the HVAC system must be able to prevent and/or rectify such a condition. Moreover, the relationship of the factors causing such a condition varies significantly.

SUMMARY OF THE INVENTION

An object of the present invention is to provide an operational protocol for an automotive HVAC system.

Another object of the present invention is to provide an energy-saving defrost/deice operation for use in automobile.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

The fogging of the interior surfaces of an automobile's windshield and/or windows is a result of moisture condensing on the interior surfaces of the windows. Water vapor will condensate on a surface whose temperature is below the dew point of the air.

The dew point is the temperature of saturated moist air at the same pressure and humidity ratio as the given mixture.

Figure 1:
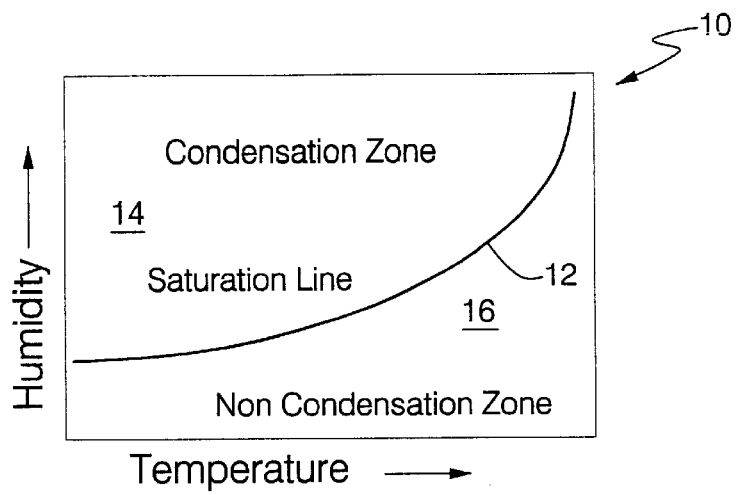
FIG. 1 is a graph illustrating condensation and non-condensation zones.

Referring now to FIG. 1, a graph 10 illustrates the relationship between surface temperature, air moisture or humidity and points where the moisture will condensate on the surface creating fog.

Graph 10 defines a "saturation line" 12 the limits or boundary defining a fogging situation for a given temperature and humidity. Graph 10 defines a condensation zone 14 and a non-condensation zone 16.

Accordingly, and in order to prevent or rectify a fogging situation, the temperature and/or the humidity must be manipulated to a point which will avoid and reduce the occurrence of an undesired fogging situation.

The heating ventilating and air conditioning system (HVAC) and climate control system of current automobiles are arranged to alter the air temperature, humidity and air flow direction in response to a defog request.

In response to a defog request, incoming air is first cooled and then heated prior to directing it to the windshield surface. This process may lead to unnecessary cooling and subsequent re-heating of the air which results in an increased load upon the vehicles HVAC system, namely, the unneeded activation of the air-conditioning system and subsequent reheating of the cooled air.

Figure 2:
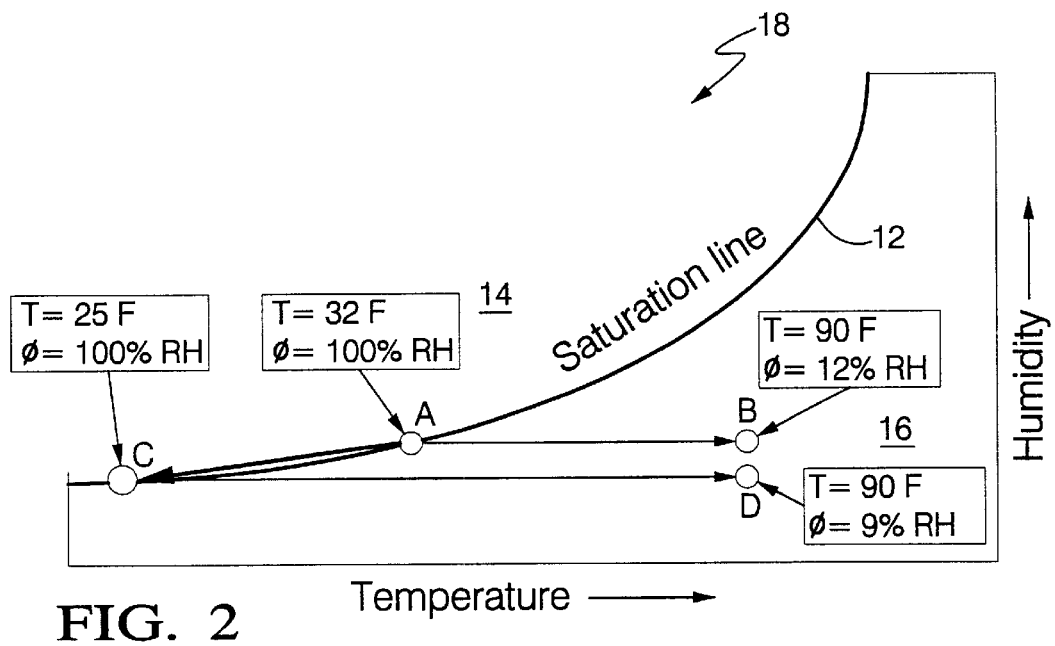
FIG. 2 is a graph illustrating possible air manipulation scenarios for providing heated air in response to a defog request.

Referring now to FIG. 2, an example of such a situation is illustrated by a graph 18. In a first scenario, air at point A is 32 degrees Fahrenheit with a 100 percent relative humidity. The air is then heated to 90 degrees Fahrenheit which changes its relative humidity to 12 percent. This is illustrated by point B. Note point B is now in the non-condensation zone 16.

In a second scenario, the air at point A is cooled by the vehicles HVAC system to a temperature of to 25 degrees Fahrenheit with a relative humidity of 100 percent. This air is illustrated by point C. Then the air at point C is heated to 90 degrees Fahrenheit, which changes its relative humidity to 9 percent which and illustrated by point D.

In comparing scenario 1 to scenario 2 there is only a 3% difference in the relative humidity of the air at points B and D. However, scenario 2 requires the activation of the air-conditioning system as well as an additional heating requirement to reach 90 degrees. This results in a higher energy load upon the vehicles HVAC system that also affects the vehicles fuel efficiency.

Moreover, if the automobile is an electric vehicle or hybrid electric vehicle (HEV) where energy conservation is critical, the needless activation of the air-conditioning system adversely affects the vehicles energy load.

Currently, automobile control systems are configured to activate the cooling system in response to a defog/deice request in order to reduce the humidity of the air.

However, and as illustrated in FIG. 2, the more efficient response is to only heat the fresh air without activating the air-conditioning system (scenario 1). Moreover, and in most cases, the ambient air in winter conditions is very dry.

In accordance with the present invention, a criterion γ for determining whether or not to activate the automobiles air-conditioning system in response to a defog or deice request, has been developed. Criterion γ can be defined as a function of ambient air temperature, ambient humidity, discharge air temperature and discharge humidity which yields the following equation:

$$\gamma = f(T_{ambient}, \phi_{ambient}, T_{air}, \phi_{air}) \quad \text{Equation 1}$$

Equation 1 can be further simplified if there is only one humidity sensor in the HVAC air duct wherein a fogging prediction algorithm is utilized.

Referring now to FIGS. 3–6, a fogging prediction algorithm for use with the instant application is illustrated. Here, the humidity ratio is defined as $\omega$, the degree of saturation is defined as $\mu$, and the saturation humidity ratio is defined as $\omega_s$.

A dew point prediction model yields the following equations:

$$\omega = \mu \omega_s$$

$$\omega_s = f(T)$$

$$\mu = \phi / \{1 + (1+\phi)\omega_s / 0.62198\}$$

The saturation humidity ratio ($\omega_s$) with respect to temperature is defined using predetermined reference values. For example, the American Society of Heating, Refrigerating and Air-Conditioning Engineers (ASHRAE) provides a publication wherein the thermodynamic properties of moist air are available.

In addition, and for the convenience of programming, the following correlation between the saturation humidity ratio ($\omega_s$) and temperature (T) was developed for use in the instant application:

$$\omega_s = 0.004 + 2.84121 \times 10^{-4} T + 6.92664 \times 10^{-6} T^2 + 1.75612 \times 10^{-7} T^3 + 4.61324 \times 10^{-9} T^4$$

Figure 3:
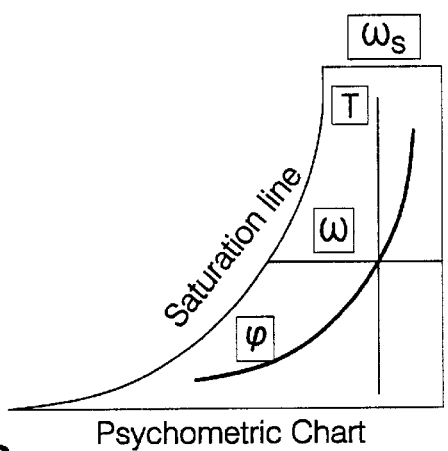
FIG. 3 is a graph illustrating a fogging prediction algorithm.
Figure 4:
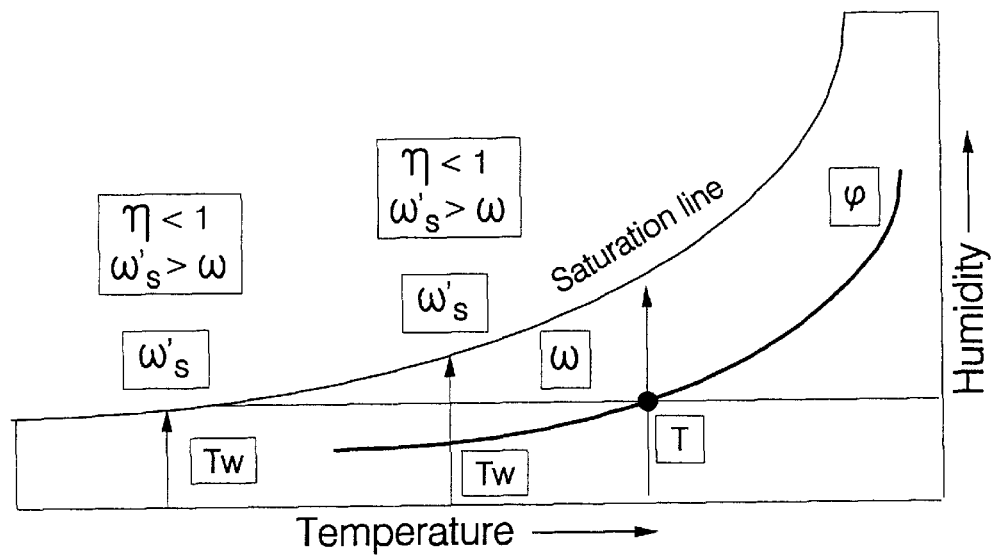
FIG. 4 is a graph illustrating an application of the fogging prediction algorithm illustrated in FIG. 3.

Referring now to FIGS. 3 and 4, the air humidity ratio is determined by measuring the temperature T and the humidity $\phi$. Then using the above equations the ratio at saturation is calculated. The degree of saturation $\mu$ is derived and the humidity ratio $\omega$ is determined.

Figure 6:
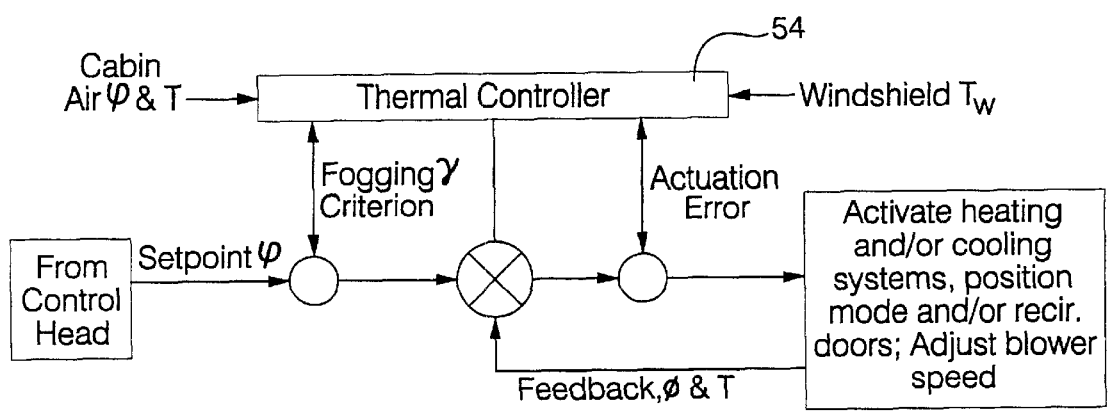
FIG. 6 is a block diagram of the automatic defog control loop illustrated in FIG. 5.
Figure 5:
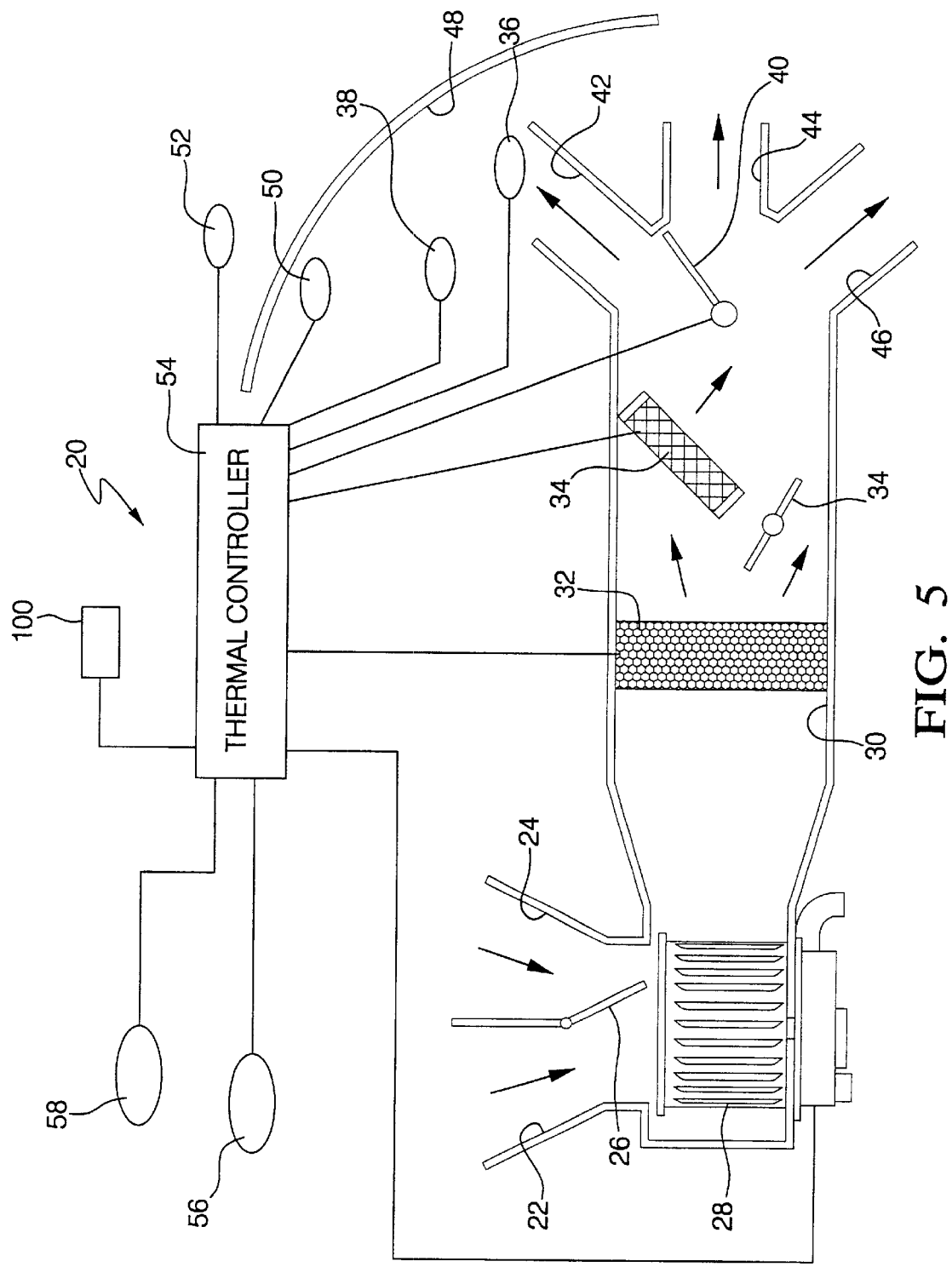
FIG. 5 is an illustration of a schematic for a climate control system utilizing the fogging prediction algorithm of FIG. 4.

Then the temperature at the windshield must be determined. FIGS. 5 and 6 illustrate one possible implementation of a HVAC system employing the dew point prediction model previously discussed wherein a temperature sensor 50 is positioned on the inside surface of the windshield.

Alternatively, an approximate algorithm of estimating windshield temperature $T_w$ can be defined as follows: $T_w = g(T_{ambient}, T_{cabin}, V)$ where V is the vehicle speed, and $T_w = (1-x)T_{ambient} + xT_{cabin}$. Here, x is a weight factor and is a function of the vehicle speed as defined by the equation $x = h(V)$.

The next step in the sequence is to determine the humidity ratio $\omega'_s = f(T_w)$ Finally, the fogging criterion is determined by the following equation:

$$\gamma = \omega'_s / \omega \quad \text{Equation 2}$$

Criterion $\gamma$ is now defined and is used to determine whether the climate of an interior passenger compartment of an automobile is in a fogging, a fogging warning or a non-fogging zone. A constant value which is based upon a calibration that is dependent upon the vehicles design defines the boundary values for fogging zones. For purposes of illustration the constant value used herein to define the fogging boundary zones is 0.8. It is, of course, contemplated in accordance with the present invention that the constant value may vary as it is dependent upon the vehicles design.

For example, and using a constant value of 0.8, $\gamma \geq 1$ defines a fogging zone, $0.8 < \gamma < 1$ defines a fogging warning zone and $\gamma < 0.8$ defines a no fogging zone.

Referring now to FIGS. 5 and 6, an automotive HVAC system 20 using the above fogging prediction algorithm is illustrated. Here system 20 receives an air input from a fresh air passage 22 and a recycled air passage 24. An air circulation door 26 controls the mixture of the fresh to recycled air that is inputted into the system. A blower or fan 28 forces the fresh and or recycled air into a main HVAC unit 30 that contains an evaporator 32 for cooling the air. Blower 28 is controlled by either a user manipulated control switch or command signals received from a controller.

A heating element 34 is positioned down stream from evaporator 32. A blend door 35 is positioned to direct the air to and/or away from heating element 34.

A temperature sensor 36 and a humidity sensor 38 are positioned to take air temperature and humidity readings. The location of humidity sensor 38 may vary in order to provide the most accurate humidity reading of the passenger compartment of an automobile. A mode door 40 is positioned to direct the air or a portion thereof to a defog pathway 42, a panel pathway 44 or a floor pathway 46.

Defog pathway 42 is positioned to deliver forced air to an automobile windshield 48.

A second temperature sensor 50 is positioned to take temperature readings at or around the windshield surface. Alternatively, and as previously discussed, the temperature of the windshield may be estimated using an empirical equation wherein sensor 50 is no longer necessary. An ambient air temperature sensor 52 is positioned to provide exterior or fresh air temperature readings.

Sensors 36, 38, 50 and 52 provide readings to a thermal controller 54. Thermal controller 54 controls the positioning of air circulation door 26, blend door 35 and mode door 40. In addition, thermal controller 54 also activates evaporator 32 and heating unit 34.

A humidity set point 56 also provides an input into controller 54. In addition, a defog/deice request 58 is also inputted into thermal controller 54.

Accordingly, and once a defog or deice request is received, controller 54 determines through the application of criterion $\gamma$ whether to activate the air-conditioning 32 and heating system 34 or the heating system only. As discussed, $\gamma$ is determined by a control algorithm and accordingly, the activation of the heating and/or refrigeration systems is based upon the ambient condition, namely, heating of air and or dehumidification of the air. Once $\gamma$ is determined, a control algorithm of controller 54 manipulates system 20.

If $\gamma \geq 1$ controller 54 actuates mode door 40 into a defog position. If, $0.8 > \gamma < 1$, controller 54 actuates mode door 40 into a defog and floor position. Moreover, and in response to the value of $\gamma$, controller 54 will also adjust recirculation door 26 and, if necessary, adjust the speed of blower 28.

Referring back now to Equation 2: $\gamma = \omega'_s / \omega$ it is noted that If $\gamma > 0.8$ then the air-conditioning system of the automobile needs to be activated to cool the air prior to its being heated and directed towards the windshield surface.

On the other hand, if $\gamma < 0.8$ then the air-conditioning system of the automobile is not required and the air only needs to be heated prior to it being directed to the windshield surface.

As an alternative, Equation 1 can also be simplified if there is no humidity sensor in the system yielding the following equation:

$$\gamma = f(T_{ambient}, T_{air}) \quad \text{Equation 3}$$

Finally, an empirical equation can be applied as follows:

$$T_{air}=0.5T_{ambient}+55 \text{ (all temperatures are in Fahrenheit)} \quad \text{Equation 4}$$

Figure 7:
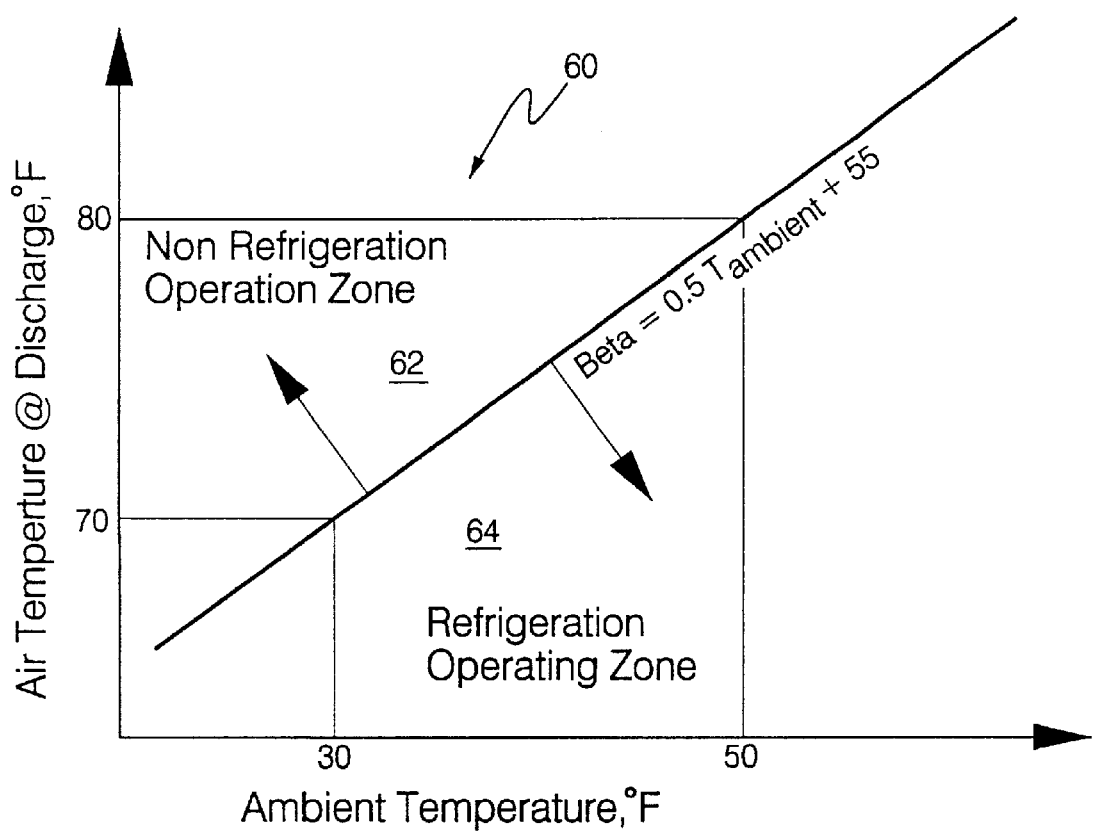
FIG. 7 is a graph illustrating refrigeration and nonrefrigeration operating zones for a defog control system.

Accordingly, equation 4 provides a graph 60 as illustrated in FIG. 7. Graph 60 defines a criterion line Beta that defines a boundary, based upon ambient and discharge air temperatures, between a non-refrigeration or no AC operating zone 62 and a refrigeration or AC operating zone 64.

Therefore, the temperature reading from sensor 36 can be utilized in the following manner.

If the temperature reading from sensor 36 (the air temperature at discharge) is less than or equal to $0.5T_{ambient}+55$, then the system is in refrigeration operating zone 64 and the air-conditioning system should be activated in response to a defog or deice operation request.

Conversely, if the temperature reading from sensor 36 is greater than $0.5T_{ambient}+55$, then the system is in non-refrigeration operating zone 62 and accordingly, there is no need for the air-conditioning system to be activated in response to a defog or deice request; therefore, only the heating system should be activated.

Accordingly, a thermal controller of a climate control system in an automobile can be preprogrammed to activate or not activate the air-conditioning system in response to a defog or deice request. Moreover, the thermal controller is programmed to utilize an energy-saving algorithm wherein activation of the air-conditioning system can be controlled in response to air temperature readings exclusively. Therefore, there is no need for humidity sensors in the energy-saving algorithm.

Moreover, since there is no requirement for a humidity sensor there is less sensor and electrical interface required between a controller and the HVAC system of an automobile. In addition, the software required to operate the controller is also made less complicated. Here a controller algorithm simply applies two temperature readings to a simplistic equation to define a refrigeration and non-refrigeration zones.

In accordance with the present invention, the climate control system operates under a criterion that determines whether or not to activate the air-conditioning system in response to a defog or deice request. Moreover, the determination of the criterion is based upon two temperature readings.

Simply put, and based upon temperature input, if criterion γ exceeds a given value, then the system will not activate the air-conditioning system in response to a defog or deice request. This prevents unnecessary cooling and subsequent reheating of the discharge air, which, in turn, prevents unnecessary power consumption. Similarly if criterion γ is less than the given value, the air-conditioning system will be activated in response to such a request.

Figure 8:
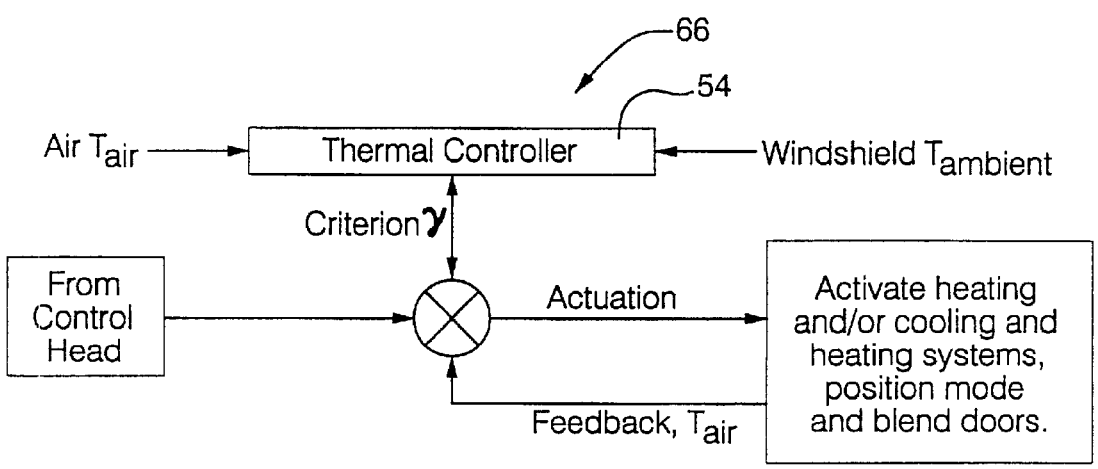
FIG. 8 is a block diagram of the energy-saving defog control loop employed by the climate control system illustrated in FIG. 5.

Referring now to FIG. 8, a block diagram 66 illustrates the energy-saving defog/deice operation strategy and control scheme in accordance with the present invention. Thermal controller 54 receives temperature inputs ($T_{ambient}$ and $T_{discharge}$) and using equation for which defines Beta, non-refrigeration operating zone 62 and refrigeration operating zone 64 (FIG. 7), thermal controller 54 determines whether or not to activate the cooling system.

Figure 9:
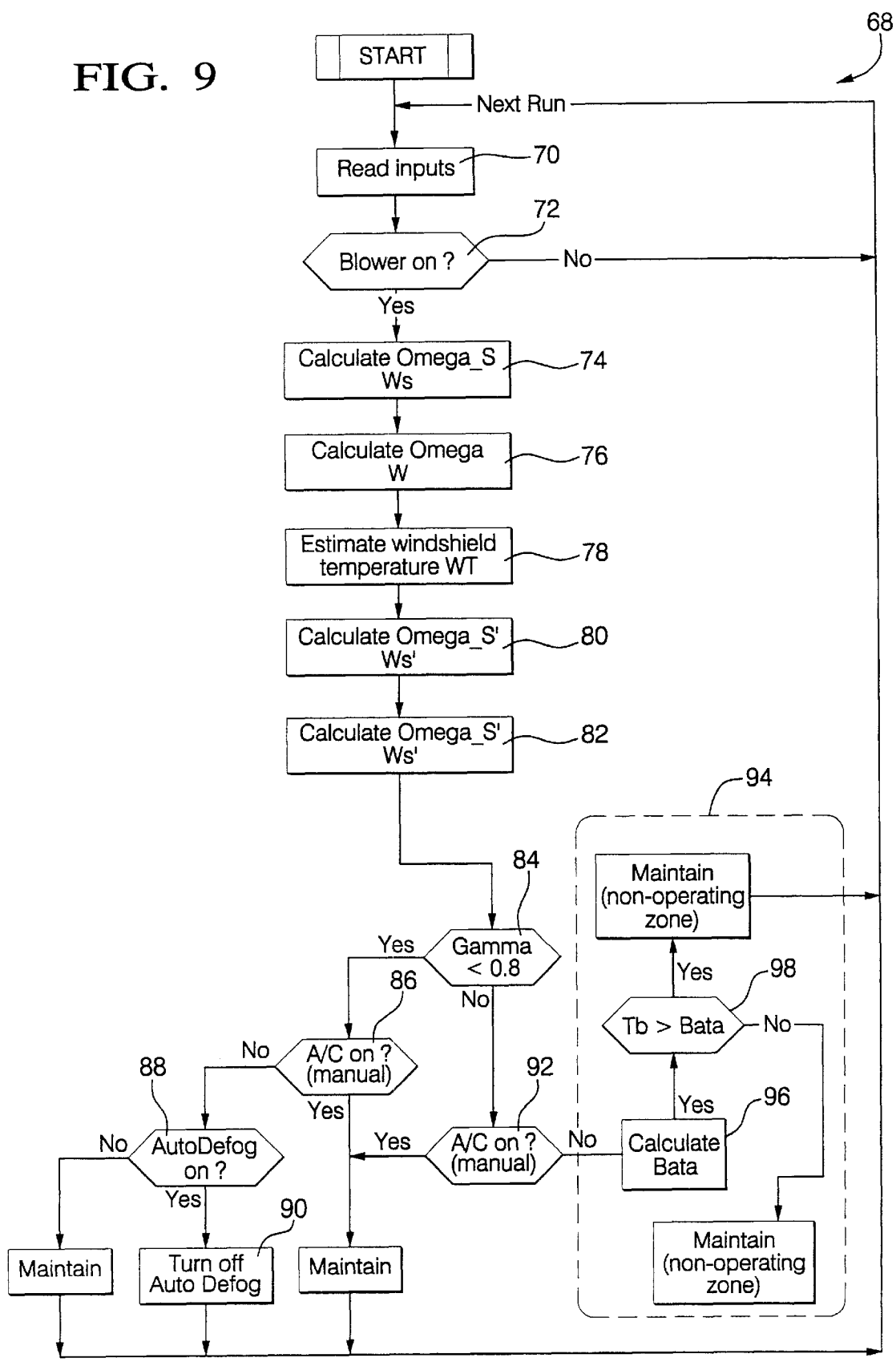
FIG. 9 is a flowchart illustrating an exemplary embodiment of a command sequence for the climate control system illustrated in FIG. 5.

Moreover, and referring now to FIG. 9 a flowchart 68 illustrates an automatic defog control logic for use with controller 54 and with the energy-saving algorithm of the instant application. A first step 70 receives the following inputs: the current status of the AC unit (on/off); the current status of the auto defog (on/off); the current blower status (on/off); Ta the ambient temperature reading from sensor 52 (FIG. 5); Tc the cabin temperature from sensor 50 (FIG. 5); Td the discharge temperature from sensor 36 (FIG. 5); vehicle speed in mph; and the relative humidity from sensor 38.

A second step or decision node 72 determines if the blower unit is on, if so, a third step 74 calculates $\omega_s$ (the saturated humidity ratio at temperature sensor 50 (Tc)) wherein $\omega_s=f(Tc)$.

A fourth step 76 calculates the humidity ratio ω based upon $\omega_s$ and using the equations:

$$\omega=\mu\omega_s$$

$$\omega_s=f(T)$$

$$\mu=\phi/\{1+(1+\phi)\omega_s/0.62198\}$$

A fifth step 78 estimates the windshield temperature Wt. (Wt=(1−x)Ta+xTd). Wherein x is a weighted factor that can be calibrated, for example, if vehicle speed (V) is less than or equal to 5 mph x=0.5; if V is greater than 70 mph x=0.9; and if 5<V=<70 mph, then x=0.5+28/V. In addition, and at higher vehicle speeds the ambient air temperature has a greater effect upon windshield temperature.

Alternatively, the windshield temperature can be determined from a temperature sensor position on, in or near windshield 48.

A sixth step 80 calculates $\omega'_s$.

A seventh step 82 Calculates $\gamma=\omega'_s/\omega$

An eighth step 84 determines whether or not γ is less than 0.8. If so, a ninth step 86 determines whether the air-conditioning has been manually activated. If so, the current status is maintained. If not, a next step 88 determines whether the auto defog is on. If so, a next step 90 turns auto defog off. If the auto defog is off already, status is maintained.

If on the other hand, gamma (γ) is greater than or equal to 0.8 a decision node 92 determines whether or not the air-conditioning system is on. If yes, the current status is maintained. If not, an energy-saving algorithm 94, as contemplated for use in accordance with an exemplary embodiment of the present invention, is employed.

A first step 96 of energy-saving algorithm 124 calculates Beta the air-conditioning system actuation criterion that defines non-refrigeration operating zone 62 and refrigeration operating zone 64. (FIG. 7).

A next step 98 determines whether the temperature reading from sensor 50 is greater than Beta. If so, the non-AC operating zone is maintained. If on the other hand, the temperature rating from sensor 50 is less than or equal to Beta, then the AC operating zone is maintained.

Alternatively, and in order to alter the control characteristics and or software which is utilized to operate the control systems and or command sequences for automotive HVAC system 20, a disk drive 100 is coupled to thermal controller 54 wherein a software upgrade may be installed into the system of thermal controller 54. This will allow improvements to the operation strategy and or software to be easily installed into the vehicles operational system. Moreover, upgrades may be mailed to a consumer negating the need for the owner to bring their vehicle into an authorized dealer for a service upgrade. Such an implementation may also negate the need for the vehicle being brought in for factory recalls which are primarily due to new software and or control systems.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of providing heated air to a windshield surface, said method comprising:
    a) reporting an ambient outside temperature from a first temperature sensor to a controller unit having an algorithm;
    b) reporting a climate control air temperature from a second temperature sensor to said controller unit;
    c) defining a control criterion value with said algorithm in response to only said ambient outside temperature;
    d) activating a heating element to provide said heated air if said climate control air temperature is above said control criterion value; and
    e) activating a cooling element and said heating element to provide said heated air if said climate control air temperature is at or below said control criterion value.

2. The method as in claim 1, wherein said control criterion value is equal to one half of said ambient outside temperature plus a constant value of fifty-five where said ambient outside temperature and said constant value are in degrees Fahrenheit.

3. The method as in claim 1, further comprising:
    controlling said controller unit to provide a first portion of the heated air from fresh air and a second portion of the heated air from recycled air in response to said control criterion value.

4. The method as in claim 1, further comprising:
    controlling said controller unit to adjust a blower speed in response to said control criterion value.

5. The method as in claim 1, further comprising:
    controlling said controller unit to control a blend door to control an amount of the heated air exposed to said heating element in response to said control criterion value.

6. An energy-saving method for operating a climate control system for providing heated air to an interior surface of a windshield of a vehicle, said method comprising:
    a) receiving a plurality of inputs, wherein said plurality of inputs includes an ambient outside temperature, a climate control discharge temperature, and an operational status of a defogging control system;
    b) determining a first control criterion value, said first control criterion value being dependent only upon said ambient outside temperature;
    c) activating a heating element in response to said operational status and if said first control criterion value is less than said climate control discharge temperature; and
    d) activating an air-conditioning system and said heating element in response to said operational status and if said first control criterion value is greater than said climate control discharge temperature.

7. The method as in claim 6, wherein said first control criterion value is equal to one half of said ambient outside temperature plus a constant value of fifty-five where said ambient outside temperature and said constant value are in degrees Fahrenheit.

8. The method as in claim 6, further comprising:
    providing a first portion of the heated air from fresh air and a second portion of the heated air from recycled air in response to said first control criterion value.

9. The method as in claim 6, further comprising:
    adjusting a speed of said fan in response to said first control criterion value.

10. The method as in claim 6, further comprising:
    controlling an amount of the heated air exposed to said heating element in response to said first control criterion value.

11. An energy-saving method for use with a climate control system for providing heated air to an interior surface of a windshield of a vehicle, said method comprising:
    a) receiving an ambient outside temperature from a first temperature sensor;
    b) receiving an interior air temperature from a second temperature sensor positioned at a point in an air passage, said point being positioned downstream from a heating element, and said heating element being positioned down stream of a cooling element;
    d) determining a criterion value, said criterion value being dependent upon only said ambient outside temperature;
    e) controlling said heating element to add heat to said heated air if said interior air temperature is greater than said criterion value; and
    g) controlling said cooling element to cool said heated air before said heating element adds heat to the heated air if said interior air temperature is less than or equal to said criterion value.

12. The method as in claim 11, further comprising:
    providing a first portion of the heated air from fresh air and a second portion of the heated air from recycled air in response to said criterion value.

13. The method as in claim 11, further comprising:
    adjusting a blower speed in response to said criterion value.

14. The method as in claim 11, further comprising:
    adjusting a blend door to control an amount of the heated air exposed to said heating element in response to said criterion value.

15. The method as in claim 11, wherein said criterion value is equal to one half of said ambient outside temperature plus a constant value of fifty-five where said ambient outside temperature and said constant value are in degrees Fahrenheit.

* * * * *